3,544,894
APPARATUS FOR PERFORMING COMPLEX WAVE ANALYSIS
Walter T. Hartwell, Lake Hopatcong, and Richard A. Smith, Morristown, N.J., assignors to Bell Telephone Laboratories, Incorporated, Murray Hill, N.J., a corporation of New York
Filed July 10, 1967, Ser. No. 652,108
Int. Cl. G01r 23/12, 23/16
U.S. Cl. 324—77      7 Claims

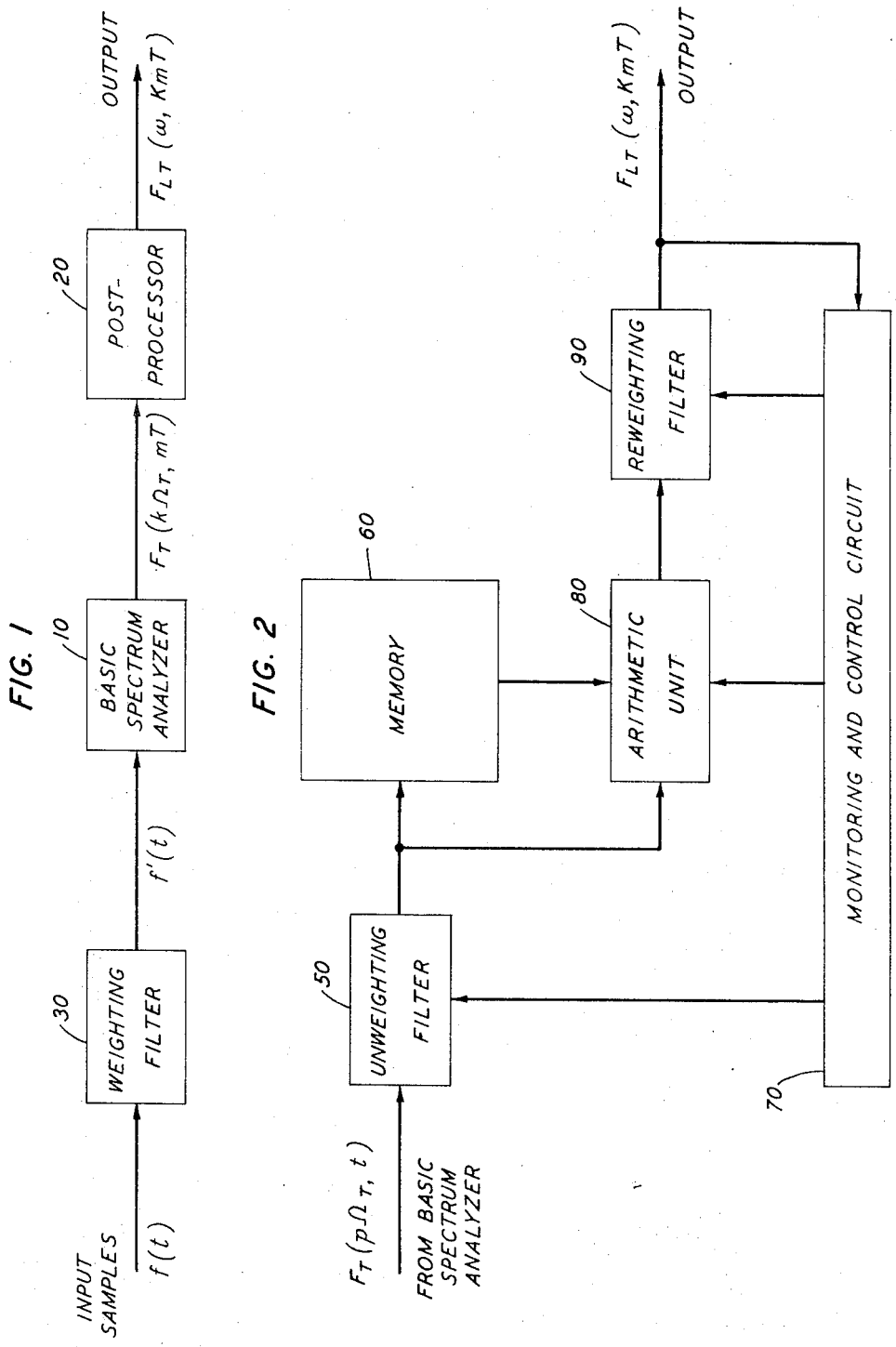

ABSTRACT OF THE DISCLOSURE

Apparatus for performing short-time complex frequency analyses of waveforms is described. One embodiment relates to a post-processor for extending the resolution, redundancy, and transient performance of a typical prior art spectrum analyzer by combining results obtained by it for a number of successive time intervals into composite results. Filtering and phase correcting operations ensure that phase information is preserved in the final results.

---

This invention relates to the spectral analysis of complex wave forms. More particularly, this invention relates to means for extending the useful capabilities of existing spectrum analyzers and to new spectrum analyzers having these extended capabilities.

Spectral analysis is a well-known tool in diverse arts including those of communication and control. Uses for spectrum analysis range from the analysis of seismic signals and cardiograms to signal analysis in speech transmission and data communication systems.

One type of spectrum analysis that is in wide use is the so-called "running" or "short-time" spectrum analysis described, for example, in J. L. Flanagan "Speech Analysis Synthesis and Perception," Academic Press, New York, 1965, pp. 120–126. Short-time frequency analyses are useful, for example, in the observation of speech signals. These analyses are performed by analyzing a portion of the signal "seen" through a specified time window or weighted with a time-weighting function. In such analyses, the frequency spectrum produced is a function of real time as well as frequency.

One important aspect of any spectrum analyzer is its resolving power or degree of resolution. Resolution relates to the ability of the analyzer to separate one frequency component from a nearby frequency component. The resolution may be increased by increasing the duration of the signal to be analyzed.

Another aspect of many spectrum analyzers is the ability to distinguish changes in frequency content with evolving time. This type of analyzer typically requires storage means, and means for performing partially redundant calculations.

While some spectrum analyzers by their very nature provide a continuous output frequency spectrum, others are arranged to provide a useful output containing information as to the spectral amplitudes only at selected values of frequency. It is often desirable, therefore, to increase the number of frequencies for which spectral information exists, i.e., interpolate between existing values.

Further, it is desirable to provide each of the above desired capabilities accurately, with minimum complexity (and therefore low cost), rapidly, and with a high degree of flexibility to allow for adaptation to changing signal and other conditions.

One widely used technique for realizing spectrum analyzers involves the use of a (usually large) bank of narrow-band-pass filters and, typically, associated oscillators and suitable combining networks. Such spectrum analyzers suffer from the need for a large number of filters if adequate resolution is to be achieved. This high degree of complexity can usually be justified only in the most sophisticated commercial systems or in limited experimental applications.

One attempt at minimizing the number of filters and associated circuitry involves the use of a single filter whose pass band is repetitively swept across the frequency range of interest. Analyzers of this type suffer inherently from limitations of speed. Thus, it is seldom possible with these analyzers to calculate spectra in real time or detect many desired transients in the spectrum.

Another method described in principle in United States Pat. 3,021,478, issued Feb. 13, 1962, provides for successive analyses of a single time record, each analysis being at a single frequency. A rapid repetition rate allows a considerable band of frequencies to be analyzed in real time. Aside from placing stringent requirements on equipment this method, in common with some of the filter methods described above, suffers from the limitation that phase information is not easily retained. That is, the real and imaginary components of a complex spectrum cannot be separately provided without considerable additional complexity.

In recent years, a notable shift in emphasis has occurred in the means employed for performing many spectrum analyses. The increasing use of digital computers of the general purpose and special purpose varieties has caused many applications involving spectrum analysis to use discrete sampling techniques rather than the analog or continuous type typified by the filter bank or swept filter methods described above. Typically, a signal is sampled and these samples are recorded in a storage medium such as a magnetic tape. Subsequently, and usually not in real time, calculations are performed by digital circuitry and the results presented as a sequence of Fourier coefficients. Such methods are described, for example, in R. B. Blackman and J. W. Tukey, The Measurement of Power Spectra; Dover Publications, Incorporated, 1959.

More recently, the use of digital techniques has received impetus from a paper entitled, "An Algorithm for the Machine Calculation of Complex Fourier Series," by J. W. Cooley and J. W. Tukey, Mathematics of Computation, April 1965. The so-called fast Fourier transform (FFT) algorithm presented by Cooley and Tukey allows rapid calculation of Fourier series far beyond the capabilities of previous techniques, and in many cases, in real time or faster. Typical spectrum analyzers based on the FFT algorithm are presented, for example, in copending United States patent applications by G. D. Bergland and R. Klahn, Ser. No. 605,791, filed Dec. 29, 1966; and M. J. Gilmartin, Jr., and R. R. Shively, Ser. No. 605,768 filed Dec. 29, 1966, Pat. No. 3,436,714.

Typically, the FFT analyzers, and other digital analyzers, produce a sequence of Fourier coefficients in response to a corresponding sequence of input sample values. Because computational symmetries often require that various relationships between input rate, storage capacity and other system parameters be satisfied, it is often difficult to adapt special purpose digital analyzers to provide a wide range of services. That is, in the interest of economy of design and simplicity of operation, it is often necessary to provide a specially-designed analyzer for each application or narrow range of applications.

Special purpose digital computers are usually more efficient in calculating signal spectra than their general purpose counterparts. General purpose machines, though more flexible, usually prove to be wasteful of operating time and are best resorted to only in less demanding applications where low cost is not a primary objective.

Further, real time analysis is seldom possible with general purpose machines, even for signals of modest bandwidth, the Cooley-Tukey algorithm notwithstanding.

The present invention provides simplified means for achieving accurate, high-resolution complex spectrum analyses. Increased information about frequency transients, and variable amounts of frequency interpolation and smoothing are also readily obtained. These advantages are provided in many cases without modification to existing equipment, and in many cases may be provided on a real time basis. Further, various of the features of the present invention are provided on a selectable or automatically adaptable basis.

One embodiment of the present invention comprises a post-processor to be used in connection with an existing spectrum analyzer of modest capability to achieve the above-mentioned desirable results. Alternatively, the present invention is incorporated in spectrum analyzers of otherwise standard form to achieve the desired properties described above.

Briefly stated, these and other desirable results are provided in accordance with one embodiment of the present invention by a post-processor which "unweights" the spectrum corresponding to a T-second interval, interpolates these unweighted results and then combines them with similar results corresponding to adjacent T-second intervals. Subsequent reweighting is then readily applied as required. The interpolated, which takes a particularly simple form, increases the number of frequencies at which spectral information exists while the combining operation effectively produces a longer interval for analysis, therefore improving frequency resolution. Additionally, the increased effective analysis interval permits higher-redundancy results to be obtained.

These and other aspects of the present invention will be described below in connection with the appended figures wherein:

FIG. 1 shows one embodiment of the present invention in the form of a post-processor in combination with a spectrum analyzer of well-known design.

FIG. 2 shows a block diagram of the post-processor of FIG. 1.

THEORY

Figure 3:
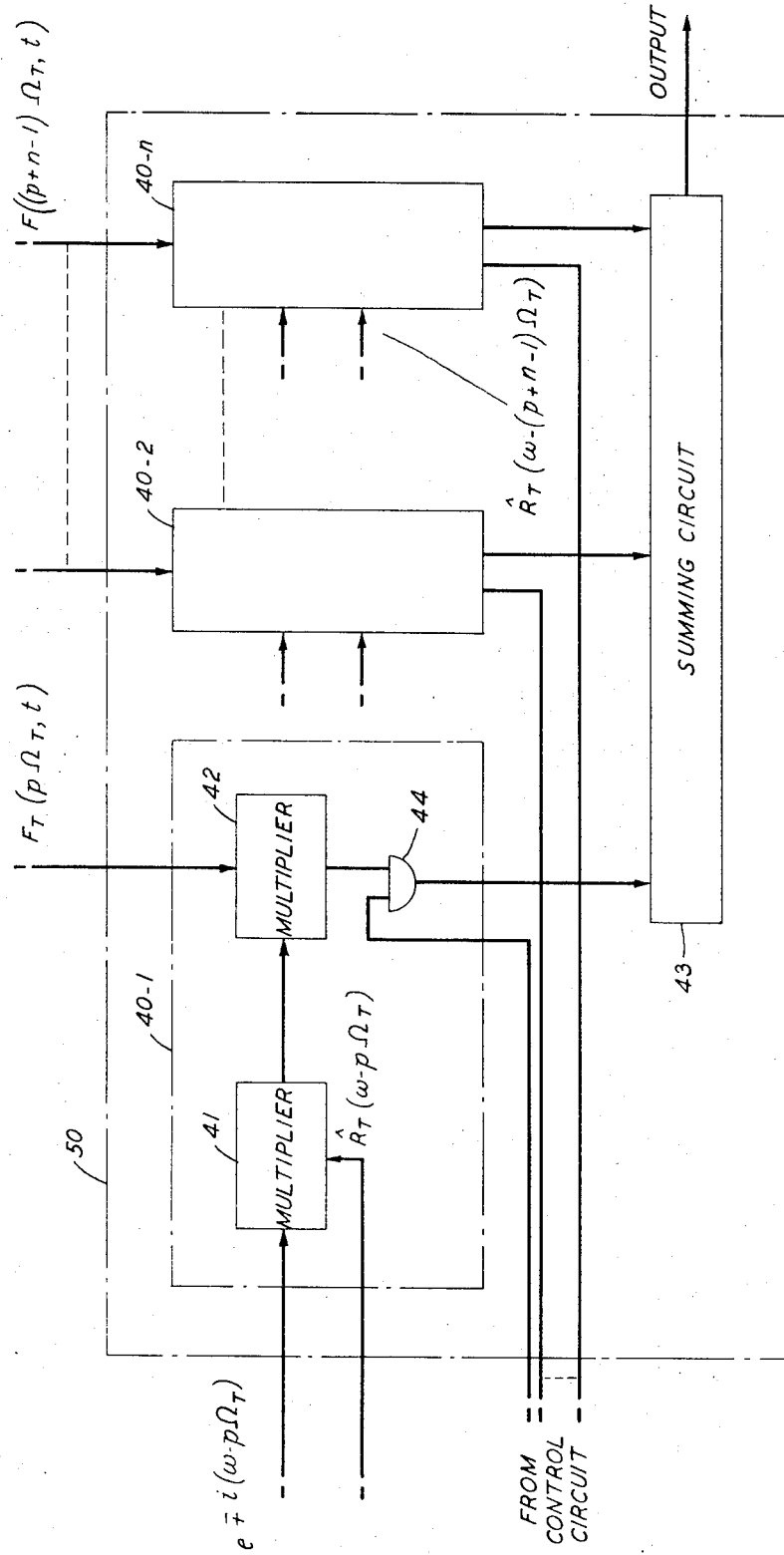
FIG. 3 shows a typical filter configuration employed in the post-processor of FIG. 2.

A complex short-time amplitude density function $F(\omega,t)$ corresponding to a time function $f(t)$ over an interval of duration T is given by $$F_T(\omega, t) = \int_t^{t+T} f(x+\tau) r_T(t+T-x) e^{\pm i\omega(t-x)} dx \quad (1)$$

where $\tau$ is an arbitrary positive constant serving to define the time origin, and $r_T(t)$ is a suitable weighting function, typically taking the form of an impulse response of a casual low-pass filter. This impulse response is typically negligible for all values of its argument greater than T. $F_T(\omega,t)$ as produced at the output of a spectrum analyzer is a function of both angular frequency $\omega$ and time $t$. The values of $\omega$ and $t$ for which the analyzer produces $F_T(\omega,t)$ can be a discrete set of values of the form $k\Delta\omega$ and $m\Delta t$ respectively, where $k$ and $m$ are integers and $\Delta\omega$ and $\Delta t$ are positive increments.

In the event that $t$ takes such discrete values, the redundancy of the analysis is said to be $\rho=T/\Delta t$. A complete analysis is provided each $\Delta t$ seconds, or each input value of $f(t)$ is involved in $\rho$ successive analyses.

The resolution of the analysis depends on T and the form of $r_T(t)$. However, it will be assumed that $r_T(t)$ has the same shape regardless of T, i.e., $r_T(t)=r_{T'}(Tt/T')$ for any positive T and T'. Thus the resolution will be a function of T only, and may be given the value $\Omega_T=2\pi/T$ for convenience. $\Omega_T$ is small for large values of T, indicating fine resolution.

A typical prior art "basic" complex spectrum analyzer produces the values $F_T(k\Omega_T,mT)$ where $\Omega_T=2\pi/T$ as above. Thus, the basic analyzer has $\Delta\omega=\Omega_T$ and $\Delta t=T$ ($\rho=1$). It should be emphasized that the basic analyzer provides the weighting $r_T(t)$. In the case where the basic analyzer uniformly weights the input values a preweighting circuit can easily be supplied for modifying the signals presented to the basic analyzer if necessary or desirable.

One embodiment of the present invention is used as a post-processor in connection with a basic spectrum analyzer producing the amplitude density function $$F_T(k\Omega_T, mT)$$

where $$\Omega_T = \frac{2\pi}{T}$$

The combination of a basic spectrum analyzer 10 and post-processor 20 shown in FIG. 1, produces an amplitude density function $F_{LT}(\omega,KmT)$, where K and L are positive integers with $K \leq L$. The output of the post-processor is then a complex short-time spectrum with resolution increased by the factor L over that of the basic analyzer. In addition, the redundancy of this new spectrum is $\rho=L/K$. The values of $\omega$ for which $F_{LT}(\omega,KmT)$ is produced may be a continuum or any discrete set.

Weighting filter 30 in FIG. 1 is typically included in the basic spectrum analyzer 10, but is shown separately for the case where it is not, and for the case where additional preprocessing is desirable.

A more complete description of the post-processor will now be given. Let $$\tilde{F}_T(\omega, t)$$

be the Fourier transform of an *unweighted* version of the input time function $f(t)$. Then $$\tilde{F}_T(\omega, t) = \int_t^{t+T} f(x+\tau) e^{\pm i\omega(t-x)} dx$$

$$= \int_t^{t+T} [f(x+\tau) r_T(t+T-x)]$$

$$\left[ \frac{1}{r_T(t+T-x)} e^{\pm i\omega(t-x)} \right] dx \quad (2)$$

the latter step involving multiplying and dividing by the same quantity. Alternate signs are provided in the exponential function to allow for the particular convention adapted for defining the transformation.

Expanding $f(x+\tau) r_T(t+T-x)$ in a Fourier series gives $$f(x+\tau) r_T(t+T-x) = \frac{1}{T} \sum_{p=-\infty}^{\infty} F_T(p\Omega_T, t) \cdot e^{\pm ip\Omega_T(x-t)} \quad (3)$$

Here the left side of the equation is the time-weighted input function, i.e., that "seen" through the window specified by $r_T(t+T-x)$. $F_T(p\Omega_T,t)$ is, then, the Fourier transform of this *weighted* function.

Substituting the right side of Eq. 3 into Eq. 2 and changing the order of summation and integration yields $$\tilde{F}_T(\omega, t) = \frac{1}{T} \sum_{p=-\infty}^{\infty} F_T(p\Omega_T, t) e^{\pm i(\omega - p\Omega_T)T} \cdot \hat{R}_T(\omega - p\Omega_T) \quad (4)$$

where $$\hat{R}_T(\omega) = \int_0^T \frac{1}{r_T(x)} e^{\pm i\omega x} dx \quad (5)$$

$R_T(\omega)$ can be considered to be the Fourier transform of an "unweighting function" $1/r_T(x)$. Thus the amplitude density function $$\tilde{F}_T(\omega, t)$$

for an unweighted function $f(t)$ can be obtained from the amplitude density function $F_T(p\Omega_T,t)$ corresponding to a weighted version of $f(t)$ by the transformation given by Eq. 4. It should be noted that although $F_T$ was specified at discrete values of $\omega=p\Omega_T$, no such limitation exists for $$\tilde{F}_T$$

as a result of the transformation. That is, the transformation indicates an interpolation as well as an unweighting.

A similar unweighted transform can be calculated for an interval LT in duration. Hence, $$\tilde{F}_{LT}(\omega, t) = \int_{t}^{t+LT} f(x+\tau) e^{\pm i\omega(t-x)} dx$$

If spectra are given at values of $t=KmT$, then $$\tilde{F}_{LT}(\omega, KmT)$$

may be expressed as $$\tilde{F}_{LT}(\omega, KmT) = \int_{KmT}^{(Km+L)T} f(x+\tau) e^{\pm i\omega(KmT-x)} dx$$

$$= \sum_{q=0}^{L-1} \int_{(Km+q)T}^{(Km+q+1)T} f(x+\tau) e^{\pm i\omega(KmT+qT-x-qT)} dx$$

or $$\tilde{F}_{LT}(\omega, KmT) = \sum_{q=0}^{L-1} e^{\pm i\omega qT} \tilde{F}_T(\omega, (Km+q)T) \quad (6)$$

Eq. 6 shows that an amplitude density function $$\tilde{F}_{LT}$$

corresponding to unweighted $f(t)$ over an interval of duration LT can easily be obtained by summing the several functions $$\tilde{F}_T$$

corresponding to unweighed $f(t)$ over successive intervals of duration T. The exponential factors on the right hand side of Eq. 6 serve to establish a phase correspondence at each frequency between each of the $$\tilde{F}_T$$

functions and a common reference phase for the entire interval of duration LT. $F_{LT}(\omega, KmT)$ may then be obtained from the values of $$\tilde{F}_{LT}(p\Omega_{LT}, KmT)$$

in a manner similar to that in which $$\tilde{F}_T(\omega, t)$$

is obtained from the values of $F_T(\rho\Omega_T, f)$ according to 4, to wit:

$$F_{LT}(\omega, KmT) = \frac{1}{LT} \sum_{p=-\infty}^{\infty} \tilde{F}_{LT}(p\Omega_{LT}, KmT)$$

$$\cdot e^{\pm i(\omega-p\Omega_T)LT} \hat{R}_{LT}(\omega-p\Omega LT) \quad (7)$$

where $$\hat{R}_{LT}(\omega) = \int_{0}^{LT} r_{LT}(x) e^{\pm i\omega x} dx \quad (8)$$

$F_{LT}(\omega, KmT)$ is the desired short-time spectrum function having the increased resolution, redundancy, and spectral sampling rate. If it is desired to smooth $F_{LT}(\omega, KmT)$, $\hat{R}_{LT}(\omega)$ in Eq. 7 is changed to a new function $\hat{R}'_{LT}(\omega)$. That is, the weighting function is redefined for the purpose of obtaining a smoothed version of $F_{LT}(\omega, KmT)$. For example, $r_T(t)$ may be a constant over $(0,T)$, and $F_T(\omega t)$ would be based on this weighting. However, in the end, one might desire $F_{LT}(\omega KmT)$ to be based on a different weighting function $r'_{LT}(t)$ such as $$.54 + .46 \sin(2\pi(t-LT)/LT)$$

the well-known "Hamming window," discussed, for example, in Blackman and Tukey, supra.

A very similar theoretical development, obvious to those skilled in the art, in light of the preceding discussion, may be given for the case where the defining integral (1) is approximated by a sum, and the other operations are based on such a sampled-data approach. In such case, the use of fast Fourier transform techniques, as described in Cooley and Tukey, supra, and elsewhere, are particularly well adapted to implement the basic spectrum analyzer.

The sums indicated in Eqs. 4 and 7 are over an infinite range. However, in practice, these sums can be truncated. With the proper choice of weight function, the accuracy will be excellent in spite of severe truncation. In particular, if $$r_T(t) = \left[.54 + .46 \cos 2\pi \frac{(t-T)^{-1}}{T}\right]$$

then $_{RT}(\omega)$, the corresponding frequency weighting function will be sharply peaked about $\omega=0$. This implies that the summations in Eq. 4 need only include a small number, typically 4, terms about the frequency then being calculated. Thus, the interpolation implied by Eq. 4 is effected according to the present invention with a minimum computation.

DETAILED DESCRIPTION

A more detailed description of one embodiment of the present invention will now be given with reference to FIG. 2. Spectral information corresponding to a weighted version of input function $f(t)$, in the form of a sequence of values $F_T(p\Omega_T, t)$, $p=0, \pm 1, \pm 2 \ldots, \pm n$, is presented at the input to unweighting filter 50 in FIG. 2. This filter is completely specified by Eq. 4 and will typically take the form shown in FIG. 3 and described below.

The output of unweighting filter 50 in FIG. 2 is a sequence of signals corresponding to $$\tilde{F}_T(\omega, t)$$

for selected values of $\omega$ and $t$. The number of values in the sequence is subject to the control of system users or, where appropriate, to monitoring and control circuit 70 in response to a changing signal or other condition.

The sequences $$\tilde{F}_T$$

for successive intervals of duration T are stored in a memory 60. The capacity of memory 60 is determined by the performance requirements of the system. If a larger number of frequencies are to be monitored, or a higher degree of resolution or greater redundancy are required, a corresponding increase in memory size is indicated. For the case where the results of only two adjacent intervals of duration T are to be combined, only two $$\tilde{F}_T$$

sequences need be stored. In some cases such a combination of two intervals is achieved with storage for but a single sequence because the then-current sequence replaces the prior sequence while both are being combined by the arithmetic unit.

Arithmetic unit 80 in FIG. 2 performs the operations implied by Eq. 6. The exponential factors in that equation are generated as required or are stored in an auxiliary memory and accessed as necessary. In the latter case the auxiliary memory can advantageously be combined with that provided for storing the sequences $$\tilde{F}_T$$

Finally, reweighting filter 90 restores the weighting function or supplies a new one as described above in connection with Eq. 8. Reweighting filter 90 is of standard design and may take the same general form as unweighting filter 50 shown in FIG. 3. The output of the post-processor is a sequence of coefficients $F_{LT}$ with resolution equivalent to a sequence produced by a spectrum analyzer of prior art types arranged to analyze signals over an interval of duration LT. Additionally, the above-described advantages with respect to redundancy and interpolation are realized. A complete analysis corresponding to an interval of duration LT is performed every T seconds and involves analysis by the basic analyzer of only those values of $f(t)$ in the most recent T-second interval.

FIG. 3 shows a typical embodiment of unweighting filter 50. This type of circuit is particularly amenable to implementation as a digital filter of well-known design. The input to such a filter is the sequence of coefficients $F_T(p\Omega_T,t)$ supplied by the basic analyzer of the FFT or other type.

In the circuit of FIG. 3 a first multiplier 41 forms the product of one of the exponential function terms and one value of the unweighting function $_{RT}$ indicated by Eq. 4. This product is then further multiplied by an appropriate element of the sequence $F_T$ by means of multiplier 42. Separate pairs of multipliers 41 and 42 are provided for each term in the sum of Eq. 4, the combination being indicated as 40–$i$, $i=1, 2 \ldots, n$ in FIG. 3. The number of terms required, and therefore the number of combinations 40–$i$ that need be provided, is dependent on the sharpness or concentration of $_{RT}(\omega)$ about $\omega=0$.

Summing circuit 43 sums the outputs of the combinations 40–$i$ and multiplies the result by the factor $1/LT$. A gate 44 under the control of monitoring and control circuit 70 in FIG. 2 is provided in each combination 40–$i$. When signal or other conditions require more or less accuracy in the filtering operation, a smaller or larger number of outputs from combinations 40–$i$ are gated to summing circuit 43. This adaptability is desirable, for example, in cases where summing circuit 43 requires a longer processing time for an increased number of inputs.

It should be noted that the unweighting according to Eq. 4 performed by filter 50, and the combining according to Eq. 6 performed, typically, by the arithmetic unit 80 need not be accomplished in the order indicated. More specifically, the $$\tilde{F}_T$$

terms in Eq. 6 can be generated as needed, i.e., the operations indicated by Eqs. 4 and 6 can be combined.

Another aspect of the present invention that is readily understood in light of the foregoing discussion is that pertaining to frequency interpolation. While many methods exist for increasing the number of frequency components specified by an analysis, these often require a weighted summing of a large number of known components in the spectrum. Typically, in accordance with the well-known sampling theorem described, for example, in P. M. Woodward, Probability and Information Theory with Applications to Radar, Oxford, Pergamon, 1953; a weighted summation of all of a set of orthogonal frequency coefficients need be performed to obtain an amplitude at a nonorthogonal frequency.

The present invention includes means for obtaining interpolated values of the amplitude spectrum corresponding to frequencies not included in the analysis performed by the basic spectrum analyzer. More particularly Eq. 4, and the filter 50 corresponding to it, specify and produce a spectrum at frequencies other than those supplied by the basic spectrum analyzer.

While the previous discussion of filter 50 characterized it as an unweighting filter, providing equal weights for all input values, it may also serve as a reweighting filter. By an unweighted signal is meant one in which all values are equally weighted, regardless of time. A reweighting filter merely changes the effective weighting applied to a signal presented for analysis. Thus an unweighting filter is but a special case of a reweighting filter. It should be borne in mind that filters corresponding to Eq. 4 perform interpolation as well as reweighting.

In particular, if it is desired that an input function $f(t)$ be frequency analyzed with a weighting function $\omega_T(t)$ with a high degree of frequency interpolation and the basic spectrum analyzer is arranged to provide a weighting of $\omega_T(t)r_T(t)$, then filter 50 in accordance with Eq. 4 can provide the desired response. $r_T(t)$ is assumed to have the desirable characteristics previously ascribed to it, viz, the Fourier transform $\hat{R}_T(\omega)$ of $1/r_T(t)$ has a peaked characteristics about $\omega=0$. The result of this choice of filter 50 is that an interpolated result is obtained having the desired weighting $\omega_T(t)$ while minimizing the number of computations required. The same result would obtain if $f(t)$ were weighted by a function $\omega(t)$ prior to being submitted to a basic analyzer with built-in weighting $r_T(t)$ as described above.

While certain embodiments of the present invention have been described in terms of digital circuitry, no such limitation is fundamental to it. In many applications the various filtering and arithmetic operations are more advantageously performed by analog circuits of well-known types.

The above description of the present invention does not exhaust all possible embodiments of it. Various modifications, extentions and applications within the spirit of the present invention and obvious in light of the above description will occur to those skilled in the art.

What is claimed is:

1. Apparatus for combining the results of frequency analyses of an input time-varying signal over a plurality of adjacent intervals of time, each of which results comprises signals representing amplitude and phase components of said input signal at a plurality of distinct component frequencies, comprising:

means for relating the phase of the result at a given frequency for each interval to a common reference by forming products of said results at said given frequency with a respective phase-correcting signal, means for forming the sum of said product signals corresponding to a given frequency, said sum including a product term for each of said plurality of intervals.

2. Apparatus according to claim 1 further comprising means for weighting the results for each interval by changing the result at one or more of said plurality of distinct frequencies in each interval relative to other such results in the same interval prior to forming said sum.

3. Apparatus for combining the results of frequency analyses of a time signal whose amplitude has been weighted by changing, according to a prescribed periodic relation, the relative amplitude at one or more times relative to that at other times within the period of said periodic relation, each of said analyses being based on said time signal during one of a plurality of adjacent time intervals each equal in duration to said period, the results for each analysis comprising signals representing amplitude and phase components of said time signal at a plurality of distinct component frequencies comprising:

means for reweighting the results of the analysis over each interval by changing the results at one or more of each plurality of distinct frequencies in each interval relative to other such results in the same interval, means for relating the phase of the reweighted result at each frequency for each interval to a common reference by forming products of said reweighted results at said given frequency by a respective phase-correcting signal, means for forming the sum of said product signals corresponding to each distinct frequency, each of said sums including a product term for each of said plurality of intervals.

4. Apparatus according to claim 3 wherein said reweighted results correspond to an unweighted version of said time signal, further comprising means for forming additional product signals corresponding to the product of selected ones of said unweighted results at separated frequencies with respective constant terms, and means for summing said additional product signals corresponding to results associated with a time duration including at least a portion of one or more of said intervals, thereby forming amplitude and phase information corresponding to said time signal at a frequency between two of said separated frequencies.

5. Apparatus according to claim 3 wherein said means for reweighting comprises means for unweighting the results of the analysis over each interval by changing the results at one or more of said plurality of distinct frequencies in each interval relative to other such results in the same interval in such manner as to effectively counteract the original weighting of said time signal.

6. Apparatus according to claim 3 further comprising means for specifying the number of said plurality of intervals for which the analysis results are to be combined, and means for storing the analysis results corresponding to said number of intervals.

7. A post-processor for extending the capabilities of a spectrum analyzer, said spectrum analyzer providing results indicating amplitude and phase density information at a plurality of frequencies corresponding to an input signal over an interval of duration T, said input signal having been weighted prior to spectrum analysis by changing the amplitude of said input signal at selected times during said interval relative to the amplitude at other selected times during said interval, said changing being in accordance with a periodic relation with period T, comprising:

an unweighting filter for unweighting results for each interval by altering said results for at least some of said plurality of frequencies relative to the results at others of said plurality of frequencies such that said unweighted results correspond to said input signal prior to weighting, a memory for storing unweighted results for a plurality of successive intervals, means for multiplying the unweighted results by a phase-correcting factor to bring the unweighted results for successive intervals into correspondence with a common reference, and means for additively combining the unweighted, phase-corrected results at an arbitarily selected frequency for each of a plurality of successive intervals to produce a composite result at the selected frequency.

References Cited

UNITED STATES PATENTS

| | | | |
|---|---|---|---|
| 3,076,177 | 1/1963 | Lawrence et al. | 324—77UX |
| 3,215,136 | 11/1965 | Holter et al. | 324—77X |
| 3,329,894 | 7/1967 | Asbury et al. | 324—77 |

OTHER REFERENCES

I.B.M. Technical Disclosure Bulletin, vol. 5, No. 1, June 1962, pp. 28–30.

RUDOLPH V. ROLINEC, Primary Examiner

M. J. LYNCH, Assistant Examiner

U.S. Cl. X.R.

235—152; 179—1